(12) United States Patent
Simond

(10) Patent No.: US 6,399,917 B1
(45) Date of Patent: Jun. 4, 2002

(54) MIG WELDING TORCH RECONDITIONING APPARATUS

(75) Inventor: Alfred Robert Simond, Comber (CA)

(73) Assignee: Tweco Products, Inc., Wichita, KS (US)

( * ) Notice: Subject to any disclaimer, the term of this patent is extended or adjusted under 35 U.S.C. 154(b) by 0 days.

(21) Appl. No.: 09/558,016

(22) Filed: Apr. 25, 2000

(51) Int. Cl.[7] ................................................. B23K 9/32
(52) U.S. Cl. ........................................ 219/136; 15/93.1
(58) Field of Search ............................ 219/136, 137.2; 15/93.1; 118/72

(56) References Cited

U.S. PATENT DOCUMENTS

| | | | |
|---|---|---|---|
| 4,583,257 A | * 4/1986 | Bridges et al. | 15/93.1 |
| 4,682,487 A | 7/1987 | Kaeseler | |
| 4,702,195 A | * 10/1987 | Thielmann | 118/72 |
| 4,834,280 A | * 5/1989 | Theilmann | 219/137.2 |
| 4,856,949 A | 8/1989 | Toshiaki | |
| 4,916,931 A | 4/1990 | Kaeseler | |
| 4,921,377 A | 5/1990 | Hoch et al. | |
| 5,138,969 A | * 8/1992 | Theilmann | 118/72 |
| 5,221,826 A | 6/1993 | Lee et al. | 219/136 |
| 5,845,357 A | * 12/1998 | Anderson | 15/93.1 |
| 5,887,666 A | 3/1999 | Chen et al. | |
| 6,023,045 A | * 2/2000 | Mangelsen et al. | 219/136 |
| 6,295,708 B1 | 10/2001 | Spaid et al. | |

FOREIGN PATENT DOCUMENTS

| | | |
|---|---|---|
| DE | 8326015 | 9/1983 |
| EP | 0090233 A1 | 3/1983 |
| EP | 61046377 | 9/1984 |
| WO | WO 99/33602 | 12/1998 |

* cited by examiner

Primary Examiner—Clifford C. Shaw
(74) Attorney, Agent, or Firm—Senniger, Powers, Leavitt & Roedel

(57) ABSTRACT

A method and apparatus for reconditioning a MIG welding torch of the type having a gas shield through which gas is exhausted from the torch comprises inserting a reaming tool within an opening of the gas shield. The reaming tool is moved relative to the gas shield within the opening into contact with deposits adhered to the gas shield within the opening. An impact force is applied through the reaming tool against the deposits in the event that movement of the reaming tool relative to the gas shield is substantially inhibited by any of the deposits.

17 Claims, 8 Drawing Sheets

MIG WELDING TORCH RECONDITIONING APPARATUS

BACKGROUND OF THE INVENTION

The present invention relates to gas-shielded welding tip reconditioning apparatus, and particularly to improvements therein useful in robotic MIG welding operations. "Welding" in the context of the present invention relates to the co-joining of two or more metal parts. The quality of the weld is affected by a number of factors, including the selection of any given welding technology, the competency of the operator, and of particular importance in the present context, the condition of the welding equipment. With regard to the condition of the equipment, the condition of the welding tip is often important. In the case of resistance welding equipment, for example, there are a variety of devices useful in connection with welding electrode maintenance—including surface reconditioning apparatus those disclosed in the following patents: U.S. Pat. No. 4,682,487; U.S. Pat. No. 4,856,949; U.S. Pat. No. 4,916,931; and U.S. Pat. No. 4,921,377.

Another well known welding technique is ARC welding—which differs from resistance welding in that ARC welding electrodes are deliberately consumed during the welding process so that the electrode material becomes an integral component of the finished weld. As a result, the problem of electrode reconditioning that is associated with resistance welding equipment, is not a problem in ARC welding.

MIG (and acronym for "metal-inert-gas") arc welding is an arc welding technique in which a relatively fine wire electrode is fed continuously from a large spool mounted on by a variable speed drive whose speed is controlled to optimise arc length and burnoff rate. During the welding process, the electrical arc that extends between the electrode and the metal surfaces that are being welded, is shielded within a gas flow. Typically argon or other gases having suitable characteristics, or mixtures thereof are used—with carbon dioxide often being the gas of commercial choice.

In gas shielded welding the wire electrode and the gas are generally channelled through a so-called "torch", which includes a central, electrically charged "tip". The tip directs the wire electrode toward the weld site, and a concentrically arranged metal gas shield (that is electrically insulated from the tip), acts as a hood to direct and maintain a coaxial flow of the inert gas in surrounding relation about the wire. The quality of the weld is contingent on both consistent and continuous gas flow and arc patterning. Anything that interferes with the gas flow or redirects or otherwise militates against the desired electrical arc pattern, will diminish the quality of the weld.

MIG welding, when properly executed, permits high welding speeds, and necessitates less operator training than is required in the case of other welding techniques. In applications where one or the other or both of these benefits are sought, the weld quality is especially sensitive to those variations that are attributable to adverse gas flow or anything which could negatively influence the desired arc pattern.

Gas flow in MIG welding can be adversely effected as a consequence of molten metal deposition. This arises as a result of backsplash splatter on the respective mutually opposed surfaces of the tip and the hood, within the interior of the torch. Similarly, (since the dielectric strength of the gas flow is otherwise a constant), the accumulation of such backsplash splatter decreases the physical and hence "electrical" distance between the charged tip and the electrically insulated hood. If the distance decreases sufficiently, the voltage differential will exceed the dielectric strength of the intervening gas flow, and the arc will jump between the tip and the hood. This results in a diminished amount of electrical energy being delivered to the weld site and a concomitant compromise in weld quality.

In view of the foregoing, it is important that MIG welding torches be cleaned regularly, in order to avoid these two latter mentioned problems. A variety of devices are available for this purpose, and many if not most involve mechanical devices such as torch clamps and reaming tool drives, that can be exposed to and damaged by the debris that is dislodged from the torch. The present invention is intended to help remedy or at least reduce the incidence/severity of such damage.

SUMMARY OF THE INVENTION

The present invention relates generally to a MIG welding torch reconditioning apparatus including a pneumatic supply line; vent; and a mechanical transmission shaft. The pneumatic supply line supplies air to the vent which in turn then vents a directed debris-scattering air-flow against the mechanical transmission shaft proximal to exposed seals thereon. This arrangement is particularly advantageous as part of a combination in which the MIG welding torch reconditioning apparatus has a pneumatic supply line that is connected to supply a pneumatically driven mechanical means, and to vent "spent-drive" air that exits from the mechanical means, through vent means as described above.

In a more specific embodiment, a MIG welding torch reconditioning apparatus according to the present invention includes a pneumatic supply line for supplying pneumatic rotary drive means, as well as a drive vent means for venting the directed debris-scattering air-flow towards a mechanical transmission shaft proximal to seals thereon. Preferably, this transmission shaft is a rotary drive shaft that is arranged in driven relation to the pneumatic drive means. The transmission shaft is also connected, in turn, in driving relation to a reaming tool that is adapted to be aligned and inserted within a torches gas-shield and to be operable therein to remove at least some of any back-splash deposits laid down on interior surfaces of the gas-shield. In an especially preferred embodiment of this aspect of the invention, the transmission shaft is an extensible rotary drive shaft, adapted to be retractably extended past a seal to position the reaming tool within said gas shield.

In an alternative aspect of the present invention there is provided a MIG welding torch reconditioning apparatus which includes a pneumatic supply line for supplying pneumatic lift means and wherein lift vent means is included, for venting a directed debris-scattering air-flow towards a mechanical transmission shaft proximal to seals thereon. In a preferred form of this particular embodiment, the transmission shaft is an extensible shaft, adapted to be retractably extended past said seals to position a reaming tool within a gas shield. An especially advantageous embodiment of this aspect of the invention involves the transmission shaft being a rotary drive shaft arranged in driving relation with a reaming tool to be aligned and inserted within a torches gas-shield and to be operable therein to remove at least some of any back-splash deposits laid down on interior surfaces of said gas-shield.

In a general sense, the present invention relates to MIG welding torch reconditioning apparatus comprising: a pneumatic supply line; pneumatic lift means powered from said supply line, pneumatic rotary drive means powered from said supply line; a mechanical transmission shaft that is connected in rotary driven relation to paid drive means and is retractably extensible on operation of said lift means. In this type of embodiment, an exhaust vent supplied by one of: air directly from said supply line; exhausted air flow from said lift means; exhausted air from said rotary drive means; or a combination of any of the forgoing. This exhaust vent is operable to vent a directed debris-scattering air-flow from these various sources, towards a said transmission shaft proximal to seals thereon. In an especially preferred form this exhaust vent is supplied at least in part by exhausted air from the rotary drive means.

In another embodiment, there is generally provided a MIG torch reconditioning apparatus which comprises an in-line, direct-drive arrangement of a motor, a mechanical transmission shaft, and chuck for receiving a reaming tool. A pneumatic lift means is provided to lift the direct drive arrangement into reaming tool engagement, (wherein the tool is positioned within a torches gas shield and operable to remove at least some of any back-splash deposits laid down on interior surfaces of said gas shield). Preferable, embodiments of this aspect of the invention include a pneumatic motor as part of the direct drive means.

In a preferred form, the direct-drive arrangement is movably arranged as a piston within a channel in a housing, and the pneumatic lift means is operable to introduce a supply of air under pressure into the channel to move the piston arrangement there-along. In an exemplary embodiment of this aspect of the present invention the direct-drive arrangement includes a cradle for supporting said pneumatic motor within the channel. The cradle comprises surfaces that are adapted to cooperate with interior channel surfaces of the housing, to form a sliding air-tight seal there-between. Typically, these cradle surfaces will include sealing rings. In addition, it is preferable in embodiments where the channel is cylindrical, that the cradle be mounted in slidably positionable relation along an at least one guide rail that is arranged within the channel. The longitudinal axis of the guide rail is oriented parallel to the channels longitudinal axis, and the rail located in an axially offset relation from the direct drive arrangement. In this way, the guide rails serves to resist reactionary rotation of the cradle within the channel during the operation of the direct drive means.

In a particularly preferred embodiment, the apparatus according to the present invention further includes a pneumatic retractor means. This retractor is operable to retract the direct drive arrangement from out of reaming tool engagement within the torches gas shield, once the tool has removed at least some of any back-splash deposits that may have been laid down on interior surfaces of the gas shield.

A preferred embodiment of the present invention includes a cradle which comprises at least two, mutually spaced apart sealing surfaces. A space is defined there-between which is otherwise also bounded by adjacent cradle and channel surface portions. A pneumatic inlet is provide through the housing and opens up into that space. In addition, the cradle includes a pneumatic (conduit) passage communicating between the space and an air inlet into the pneumatic motor. In this arrangement, air that is supplied through the housing inlet is deliverable to the motor through the above mentioned "space" and the "passage" over a range of positions in which the inlet is in register between the spaced apart sealing surfaces. In this way, the motor can be powered over a range of its axial positioning, relative to the introduction and retraction of the reaming tool into and from a gas shield.

Moreover, it is also preferred that the cradle include a port for exhausting drive air from the motor. Such a port can comprise, for example, a telescoping snorkel adapted to channel drive air exhaust exteriorly of the housing.

In yet another embodiment of the present invention, there is generally provided a MIG welding torch reconditioning apparatus which comprises means adapted to hold a reaming tool to be aligned and inserted within a torches gas-shield. The reaming tool is itself adapted to be operable within the confines of the gas-shield to remove at least some of any back-splash deposits laid down on interior surfaces of said gas-shield.

When the apparatus is in use the motor-driven reaming tool is operable in intermittently driven relation. More specifically, when an incipient stall condition arises, (i.e. a condition in which the torque available from the motor is insufficient to properly rotate the reaming tool against loads occasioned by contact of the reaming tool against welding deposits within the gas-shield), then the apparatus responds by causing the motor to discontinue driving the reaming tool until sufficient motive force can be brought to impact through the reaming tool and in turn against the contacted deposits. This in turn, is intended to allow the apparatus to return to it normal reaming operation.

The advantages of this apparatus are particularly applicable to small pneumatic motors. Accordingly, in a contemplated embodiment of the present invention the torch reconditioning apparatus described above, might include a pneumatic motor and its drive would be suspended as contemplated above, by the specific means of a feed-back operated valve in a pneumatic supply line to the motor. This valve would be operative in response to feed-back signaling an incipient stall condition, to interrupt an air supply from driving the motor. It would then suddenly reconnect the air supply to provide sufficient motive force to impact through the reaming tool against the contacted deposits, to allow the apparatus to return to normal reaming operation.

Although this arrangement may provide some of the benefit associated with the present invention, there is every reason to believe that more efficacious results might be realized through the use of clutch means to selectively uncouple and re-couple the motor (whether pneumatic or otherwise) from driving relation with the reaming tool. The clutch would be thereby operable when the motor encounters an incipient stall condition, to responds by causing the motor to discontinue driving the reaming tool. Such discontinuity would persist until sufficient motive force can be brought upon re-engaging said clutch, to impact through the reaming tool and in turn against the contacted deposits.

A clutch within the present contemplation might, without limiting the generality of the explicit function, be mechanical, electrical, pneumatic or hydraulic in its operation.

Generally speaking, therefore, it is preferable for the purposes of the present invention that the MIG welding torch reconditioning apparatus comprise torch reconditioning means adapted to hold a reaming tool to be aligned and inserted within a torches gas-shield; and, to be operable therein to remove at least some of any back-splash deposits laid down on interior surfaces of said gas-shield, and wherein said torch reconditioning means includes an intermittent drive coupling arranged intermediate between a motor and said reaming tool, and operable there between to uncouple a reaming tool transmission side of said coupling from a motor-powered drive side of said coupling when, in operation, the torque available from the motor is insufficient to properly rotate the reaming tool against loads occasioned by contact of the reaming tool against welding deposits within the gas-shield, whereupon the motor rotates the drive side of the coupling under unloaded-motor conditions until the drive coupling re-couples through complementary mating surfaces thereof to thereby transmit the resulting impact force through the reaming tool and against and contacted deposits.

In a particularly preferred form of the present invention, there is provided a MIG welding torch reconditioning apparatus comprising, torch reconditioning means adapted to hold a reaming tool to be aligned and inserted within a torches gas-shield; and, to be operable therein to remove at least some of any back-splash deposits laid down on interior surfaces of said gas-shield, and wherein said torch reconditioning means includes a mechanical, impact-clutch intermittent drive coupling arranged intermediate between a motor and said reaming tool, and operable there between to uncouple a reaming tool transmission side of said coupling from a motor-powered drive side of said coupling when, in operation, the torque available from the motor is insufficient to properly rotate the reaming tool against loads occasioned by contact of the reaming tool against welding deposits within the gas-shield, whereupon the motor rotates the drive side of the coupling under unloaded-motor conditions until the drive coupling re-couples through complementary mating surfaces thereof to thereby transmit the resulting impact force through the reaming tool and against and contacted deposits.

Again, this apparatus is particularly useful in combination with a pneumatically driven motor. Particular versatility can be realized when the coupling is reversibly operable and the motor is a reversible pneumatically driven motor.

In an especially preferred form, the present invention comprises a MIG welding torch reconditioning apparatus comprising, torch reconditioning means that is adapted to hold a reaming tool to be aligned and inserted within a torches gas-shield. When so held, the reaming tool is operable to remove at least some of any back-splash deposits laid down on interior surfaces of said gas-shield.

In addition, the torch reconditioning means includes an impact-clutch intermittent drive coupling arranged intermediate between a motor and the reaming tool. The drive coupling is operable in two modes.

In a first mode, it operates to uncouple a reaming tool transmission side of said coupling from a motor-powered drive side of said coupling. This it accomplishes through disengagement of complementary hammer and reception block surfaces of the coupling which it does under predetermined high motor-load conditions.

In a second mode, the drive coupling operates to re-couple the drive and transmission sides of the coupling, which it does by impacting the hammer and reception block surfaces against one another.

Thus, when this latter embodiment is in operation, and the torque available from the motor is insufficient to properly rotate the reaming tool against loads occasioned by contact of the reaming tool against welding deposits within the gas-shield, then the drive coupling uncouples the tool from the motor. Once uncoupled from the reaming tool loading, the motor rotates the drive side of the coupling freely under unloaded-motor conditions. This forces the hammer and reception block surfaces to impact against one another and to thereby transmit the resulting impact force through the reaming tool and against the contacted deposits and greatly increases the instantaneous forces that are available to dislodge that material.

In still another embodiment of the present invention, a clamp is provided for engaging a cylindrical body between a pair of generally orthogonally-offset faces of a "V"-block and respective gripping surfaces on gripping surface members of a pair of opposed jaws. The jaws are arranged on respective jaw pivots and also include respective lever arms which extend beyond the pivots. Each such lever arm supports respective cam followers in spaced apart relation from their respective jaw pivots. The clamp also includes movable cam surfaces which are adapted to act on the cam followers in such a way as to rotate the lever arms and associated jaws about their pivots. This translates in turn, into movement of the gripping surfaces in and out of a three-way engagement of the cylindrical body between said surfaces and the "V"-block (or more specifically, the above mentioned "faces" thereof.

In a preferred form of the clamp, each of the orthogonally-offset faces are arranged in generally parallel, mutually-opposed relation to a corresponding gripping surface on a gripping surface member. The "V"-block in this clamp, is mounted on a "V"-block pivot and is rotatable about same to permit the cylindrical body to be engaged in a self-centering relation between the "faces" and the "surfaces" of the jaws and the "V"-block, respectively.

Preferably, the cam surfaces are side walls of a milled track arranged in a slide plate which is selectively movable between positions corresponding to the gripping surfaces being, respectively, in and out of the three-way clamp engagement of the cylindrical body.

In an additionally preferred feature of the invention, the cam surfaces are comprised of a primary portion that is configured to direct the cam followers and to translate the motion thereof through the lever arms, to move the jaws rapidly towards engagement with a lower mechanical advantage. A secondary portion of the cam surfaces are configured to direct the cam followers and thereby translate the motion thereof through the lever means, to move the jaws more slowly into engaged relation with the cylindrical body, with greater mechanical advantage.

The plate is preferably selectively driven by a pneumatic piston.

The clamp according to the present invention is desirably arranged such that the plate, the lever arms, and the cam followers are enclosed within a housing, while the "V"-block and the gripping surface members arranged externally thereof. A central resilient cylindrical seal is arranged generally tangentially against the jaws, between and proximal to the jaw pivots, to thereby reduce ingress of debris into the housing. Respective ones of outboard cylindrical seals are arranged adjacent the pivots and generally tangentially between corresponding ones of the jaws, and adjacent portions of the housing, to thereby reduce ingress of debris into the housing.

DETAILED DESCRIPTION OF THE PREFERRED EMBODIMENT

Figure 1:
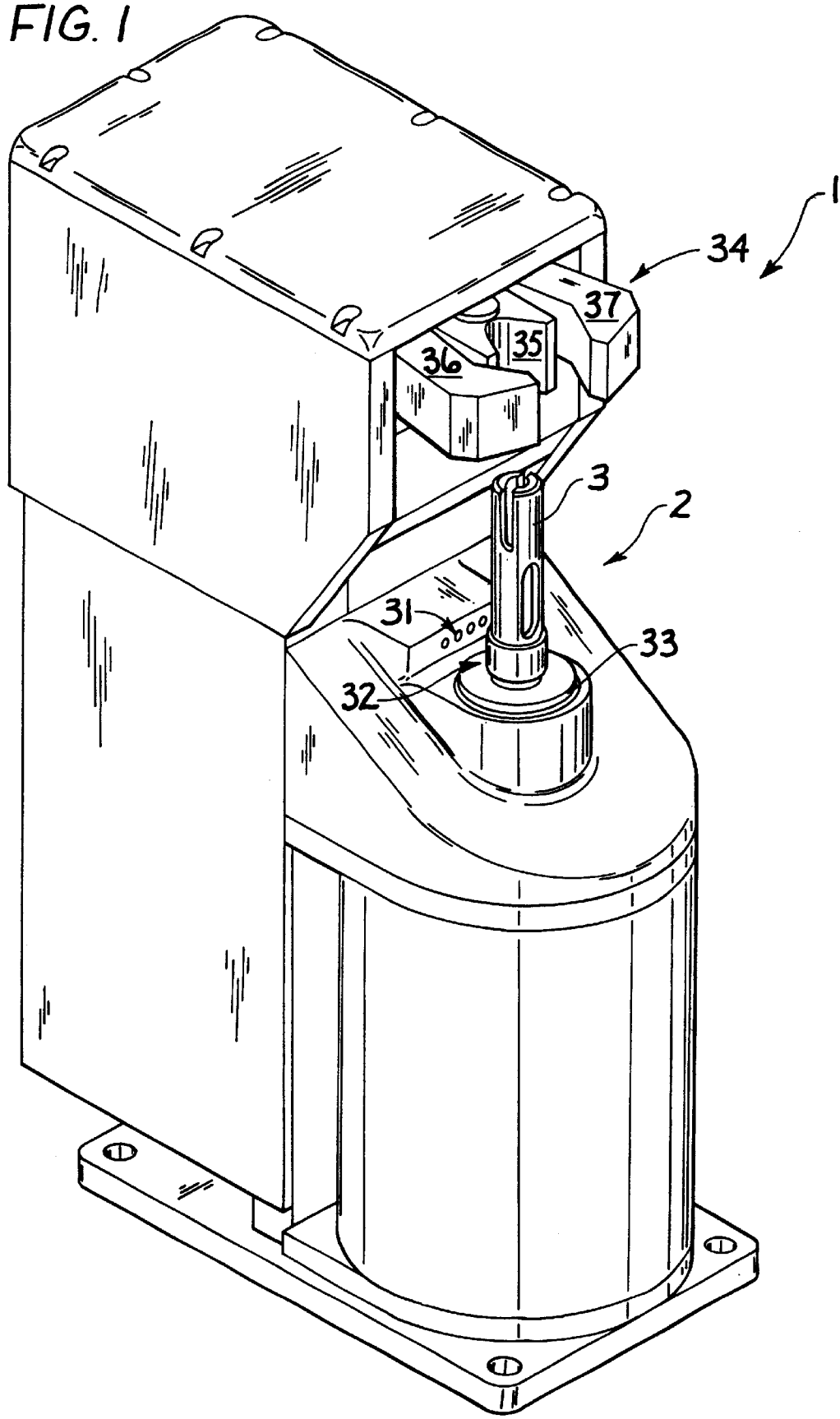
FIG. 1 of the appended drawings is a front-quarter perspective view of a preferred MIG welding torch reconditioning apparatus according to the present invention.
Figure 2:
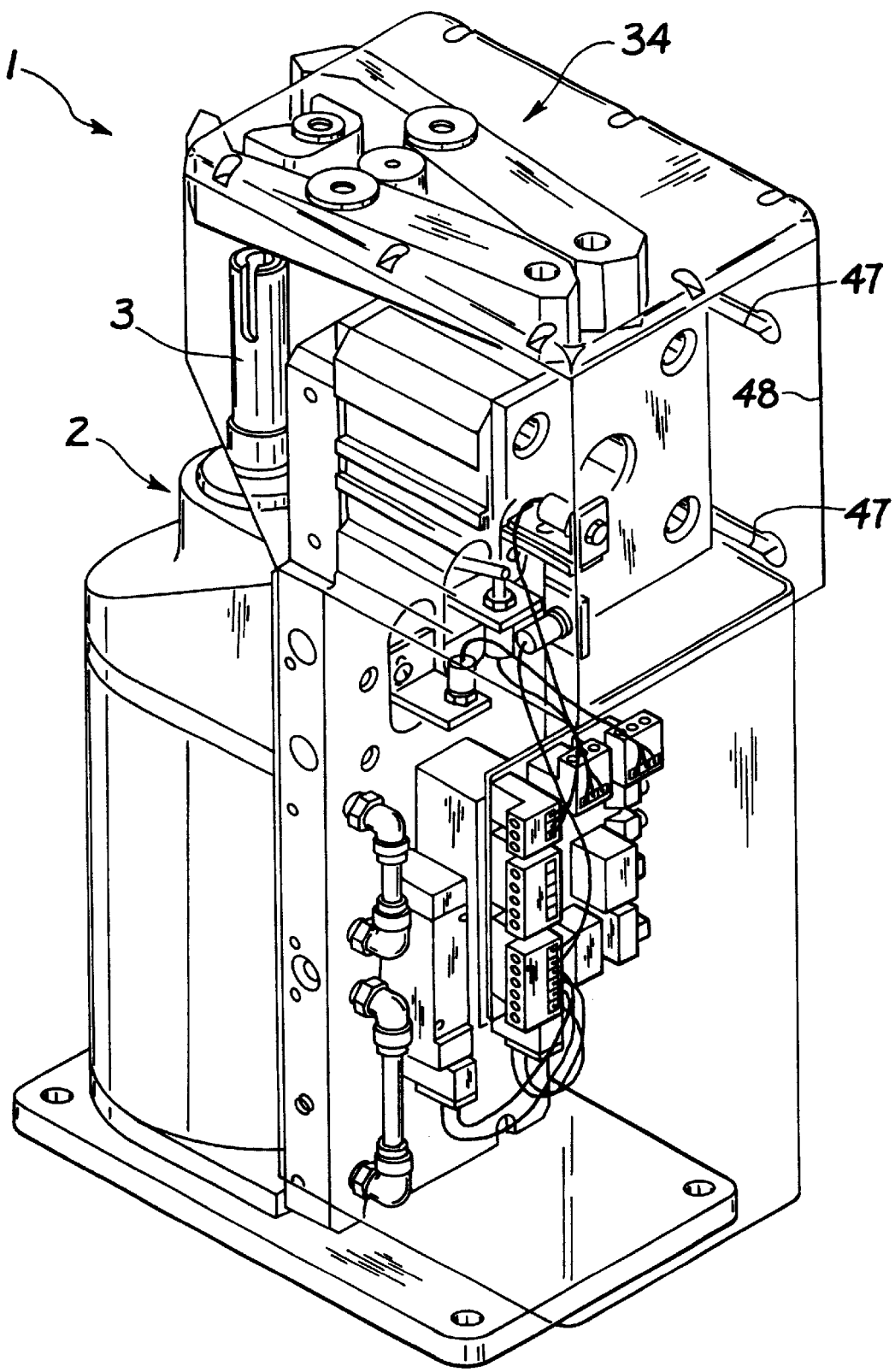
FIG. 2 is a view of the apparatus illustrated in FIG. 1, from a rear-quarter with the rear casing shown in partial phantom, to reveal interior workings of the apparatus.

Referring now to the appended Figures generally, (except as otherwise specified from time to time), there is depicted a preferred MIG welding torch reconditioning apparatus 1, embodying the present invention, and comprising a preferred torch reconditioning means that is indicated generally by reference numeral 2.

Torch reconditioning means 2 is adapted to hold a reaming tool 3, so that said tool can be aligned and inserted within a gas shield of a torch. The shield being designated by reference numeral 4 in FIG. 6. When so positioned, the tool is operable to remove at least some of any back-splash deposits laid down on the interior surfaces of shield 4.

In this preferred torch reconditioning means 2 the motor-driven reaming tool is operable in intermittently driven relation, such that when an incipient stall condition arises in which the torque available from the motor 5 is insufficient to properly rotate the reaming tool 3 against loads occasioned by contact between the reaming tool and welding deposits adhering to shield 4, then apparatus 1 responds by causing the motor 5 to discontinue driving the reaming tool until sufficient motive force can be brought to impact through the reaming tool and in turn against the contacted deposits, to allow the apparatus 1 to then return to normal reaming operation cycle.

Motor 5 is a pneumatic motor. Note that in an alternative embodiment of the present invention (not shown in the appended drawings), it is contemplated that the drive of the pneumatic motor could be suspended by a mechanism comprising feed-back operated valve in a pneumatic supply line to said motor, the said valve being operative in response to feed-back signaling an incipient stall condition. In operation, this would interrupt an air supply from driving the motor, and then suddenly reconnect the supply to provide sufficient motive force to impact (through the reaming tool) against the contacted deposits, to dislodge same under the suddenly applied force, and to allow the apparatus to return to normal reaming operational cycle. However, such an alternative embodiment is not presently preferred.

Instead, the mechanism of the presently preferred embodiment of the MIG welding torch recondition apparatus of the present invention comprises a clutch (indicated generally by reference numeral 6). Clutch 6 is provided to selectively uncouple and re-couple motor 5 from driving relation with reaming tool 3. In this way, clutch 6 is operable when motor 5 encounters incipient stall conditions to respond to the incipient stall condition by uncoupling the motor from the reaming tool, causing motor 5 to discontinue driving the reaming tool until sufficient motive force can be brought on by the re-coupling of the clutch 6 to impact through the reaming tool 3 and in turn against the contacted deposits, to dislodge same and allow the apparatus to return to normal reaming operational cycle.

Although the clutch could be mechanical, electrical or hydraulic in nature, clutch 6 is preferably mechanical, as shown. More particularly, in accordance with the depicted preferred embodiment of the present invention, clutch 6 is operable under incipient stall conditions, such that the motor rotates the drive side of the clutched coupling between the motor 5 and reaming tool 3, under unloaded-motor conditions. This mode of operation continues until the drive coupling re-couples through complementary mating surfaces (referenced generally at 7) thereof (i.e. of clutch 6) to thereby transmit the resulting rotary-impact force through a simple and direct coupling (see for example, FIG. 3 of the appended drawings) with rotatable mechanical transmission shaft 12 to the reaming tool 3 and against any contacted deposits.

Accordingly, in this particular embodiment of the present invention, clutch 6 includes a mechanical impact-clutch intermittent drive coupling 8 that is arranged intermediate between motor 5 and reaming tool 3. As mentioned above, this arrangement is operable to uncouple a reaming tool transmission side (indicated generally by 8a) of coupling 8 from a motor-powered drive side (indicated generally by 8b) thereof. When, in the course of a normal operational cycle, the torque available from motor 5 is insufficient to properly rotate the reaming tool against loads occasioned by contact of the reaming tool against welding deposits within the shield 4, the motor rotates the drive side of the coupling under unloaded-motor conditions until the drive coupling re-couples through complementary mating surfaces thereof to thereby transmit the resulting impact force through the reaming tool and against and contacted deposits.

In accordance with the preferred aspects of the present invention as embodied in the illustrated features herein, motor 5 is a pneumatically driven motor; and both the coupling 8 and motor 5 are reversibly operable.

As regards impact mating surfaces 7, these are comprised of complementary hammer 9 and reception block 10 surfaces of coupling 8.

Impact drive devices are generally known—including that disclosed in U.S. Pat. No. 5,887,666 which is incorporated herein by reference. The impact drive illustrated in the appended drawings was obtained from Campbell Hausfeld, of Harrison, Ohio.

Figure 3:
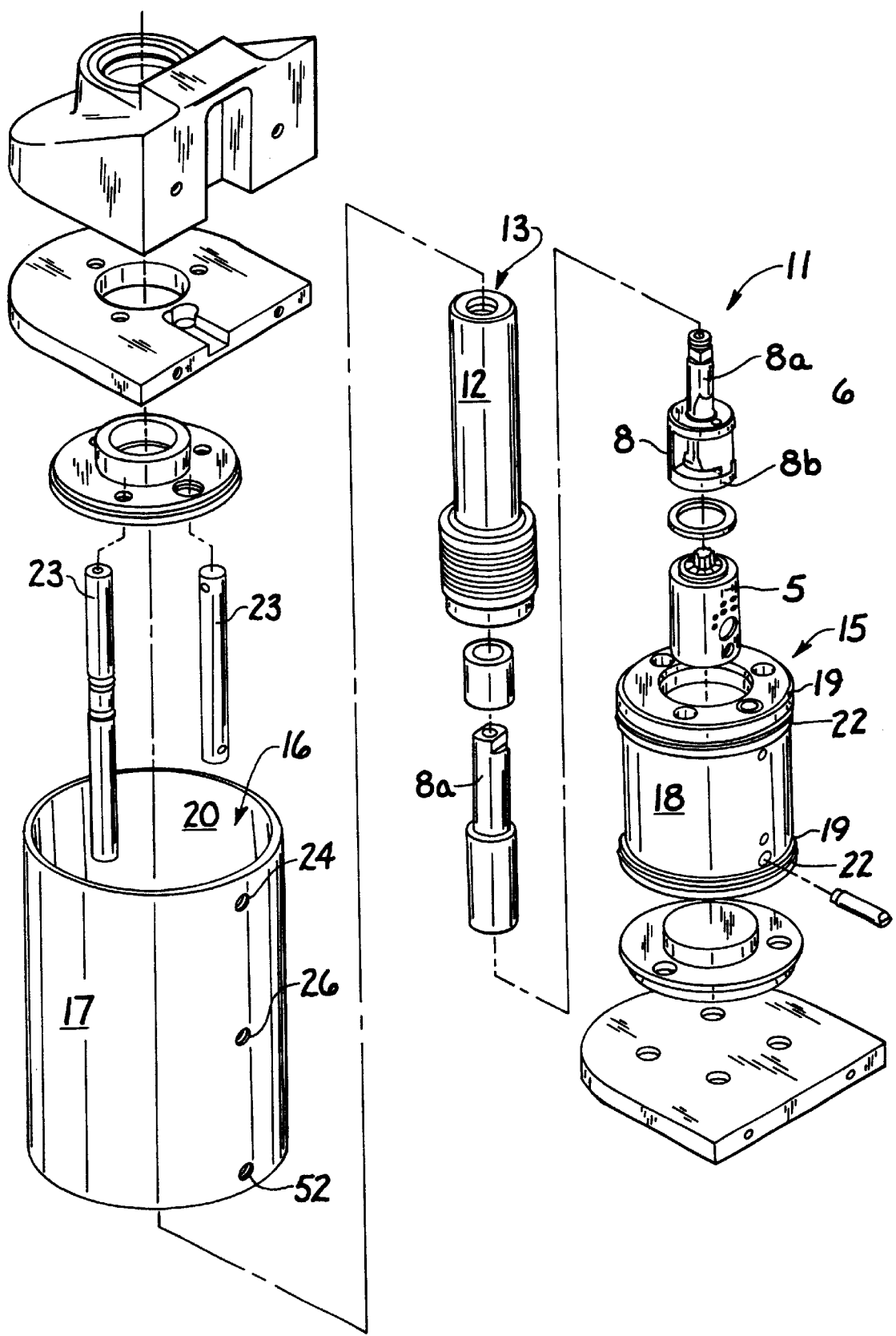
FIG. 3 is an exploded view of drive components as arranged within the embodiment depicted in FIGS. 1 and 2.
Figure 5:
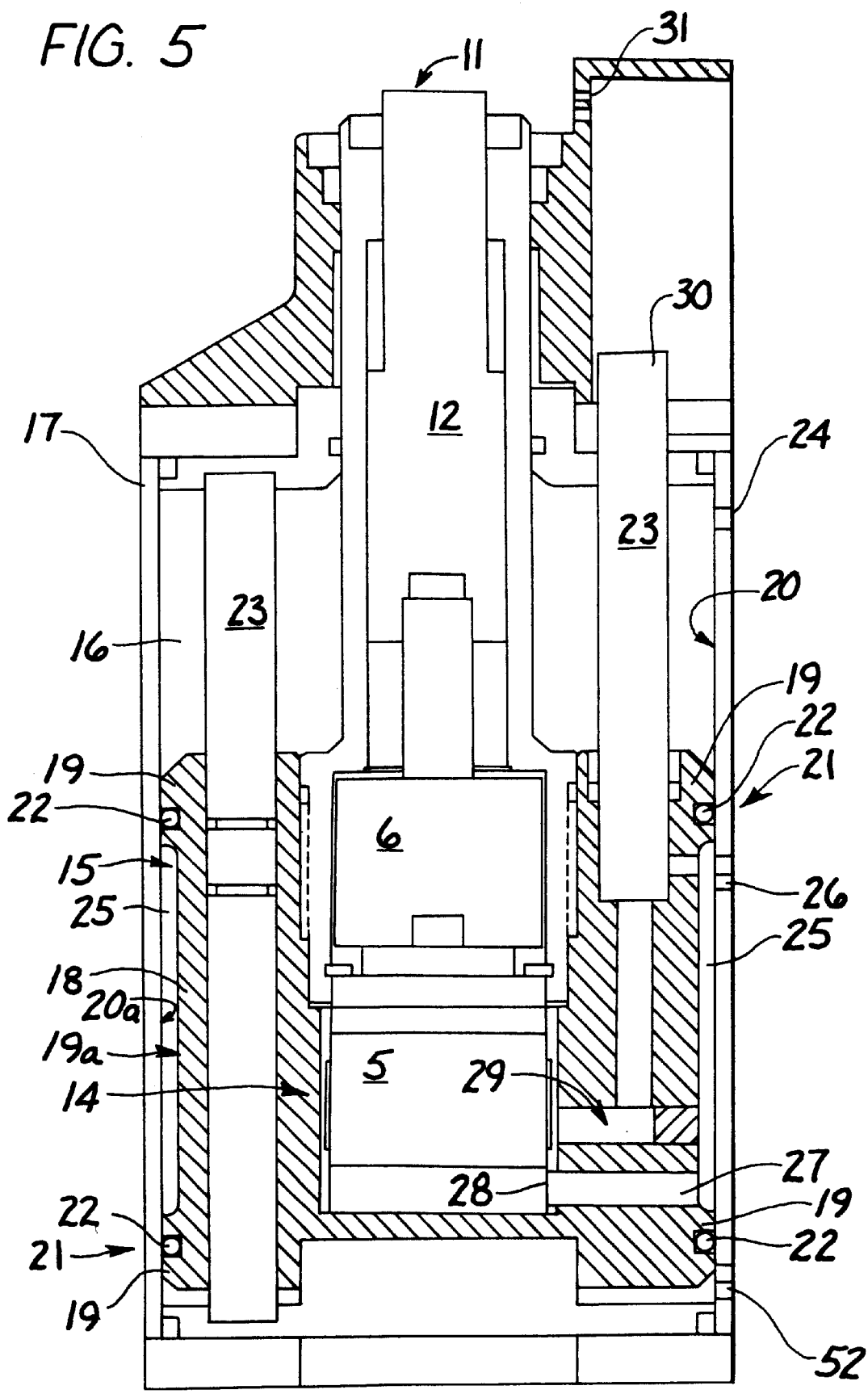
FIG. 5 depicts a preferred lift mechanism in accordance with the embodiment depicted in the preceding figures.

Referring now in particular, but not exclusively, to FIGS. 3 and 5 of the appended drawings, there is illustrated a MIG torch reconditioning apparatus 1 comprising an inline, direct-drive arrangement 11, of a motor 5, a mechanical transmission shaft 12, and chuck means 13 for receiving a reaming tool 3. Pneumatic lift means 14 is provided to lift the direct drive arrangement 11 to engage reaming tool 3 with torch gas shield 4, so that tool 3 is operable to remove at least some of any back-splash deposits laid down on interior surfaces of gas shield 4.

Direct-drive arrangement 11 is movably arranged as a piston 15 within a channel 16 in a housing 17, and said pneumatic lift means 14 is operable to introduce a supply of air under pressure into channel 16 to move piston 15 therein. Direct-drive arrangement 11 includes a cradle 18 for supporting pneumatic motor 5 within channel 16. Cradle 18 comprises surfaces 19 adapted to cooperate with interior channel (16) surfaces 20 of housing 17, to form sliding air-tight seals 21 there-between. These include sealing rings 22.

In this preferred embodiment, channel 16 is cylindrical and cradle 18 is mounted in slidably positionable relation along an at least one guide rail 23 that is arranged within channel 16 and parallel to the channels longitudinal axis. Rail (or rails, as in the present case) 23, is offset from direct drive arrangement 11 and operable to resist rotation of cradle 18 within channel 16. Additionally, MIG torch reconditioning apparatus 1 further includes pneumatic retractor means (including pneumatic inlet 24 into housing 17) operable under pneumatic control to retract direct drive arrangement 11 from out of reaming tool engagement within torch gas shield 4 after tool 3 has removed at least some of any back-splash deposits laid down on interior surfaces thereof.

Cradle 18 comprises two, mutually spaced apart, sealing surfaces 21 defining a space 25 there-between which is otherwise bounded by adjacent cradle and channel surface (reference numerals 19 and 20, respectively) portions 19a and 20a. A pneumatic inlet 26 through housing 17 communicates into space 25, and cradle 18 includes a pneumatic passage 27 communicating between space 25 and an air inlet 28 into pneumatic motor 5. Air supplied through housing inlet 26 is delivered to motor 5 through space 25 and passage 27 throughout a range of cradle positions over which inlet 26 is in register between respective top and bottom sealing surfaces 21. Cradle 18 includes a port 29 for exhausting drive air from motor 5. Port 29 comprises a telescoping snorkel 30 that is adapted to channel drive air exhaust exteriorly of housing 17.

In accordance with the present invention, MIG welding torch reconditioning apparatus 1 includes vent means 31 for venting a directed debris-scattering air-flow from housing 17 and against a portion 32 of the mechanical transmission shaft proximal to exposed seals 33 thereon. Portion 32 of the transmission shaft is an extensible rotary drive shaft, adapted to be retractably extended past seals 33 to position reaming tool 3 within shield 4.

As illustrated in FIG. 5, the pneumatic inlet 26, space 25, pneumatic passage 27, air inlet 28, port 29 and snorkel 30 broadly define a pneumatic supply line for directing debris-scattering air-flow to the vent means 31. However, it is understood that the pneumatic supply line may be a direct flow path from the inlet 26 to the vent means 31, bypassing the motor 5, or any other indirect flow path that directs air from the inlet 26 to the vent means 31. It is also contemplated that the pneumatic supply line may include a passage 52 through which air is delivered to the pneumatic lift means 14 for driving the lift means, and may further include an exhaust vent (not shown) for exhausting air from the lift means and directing the air to the vent means 31.

Figure 6:
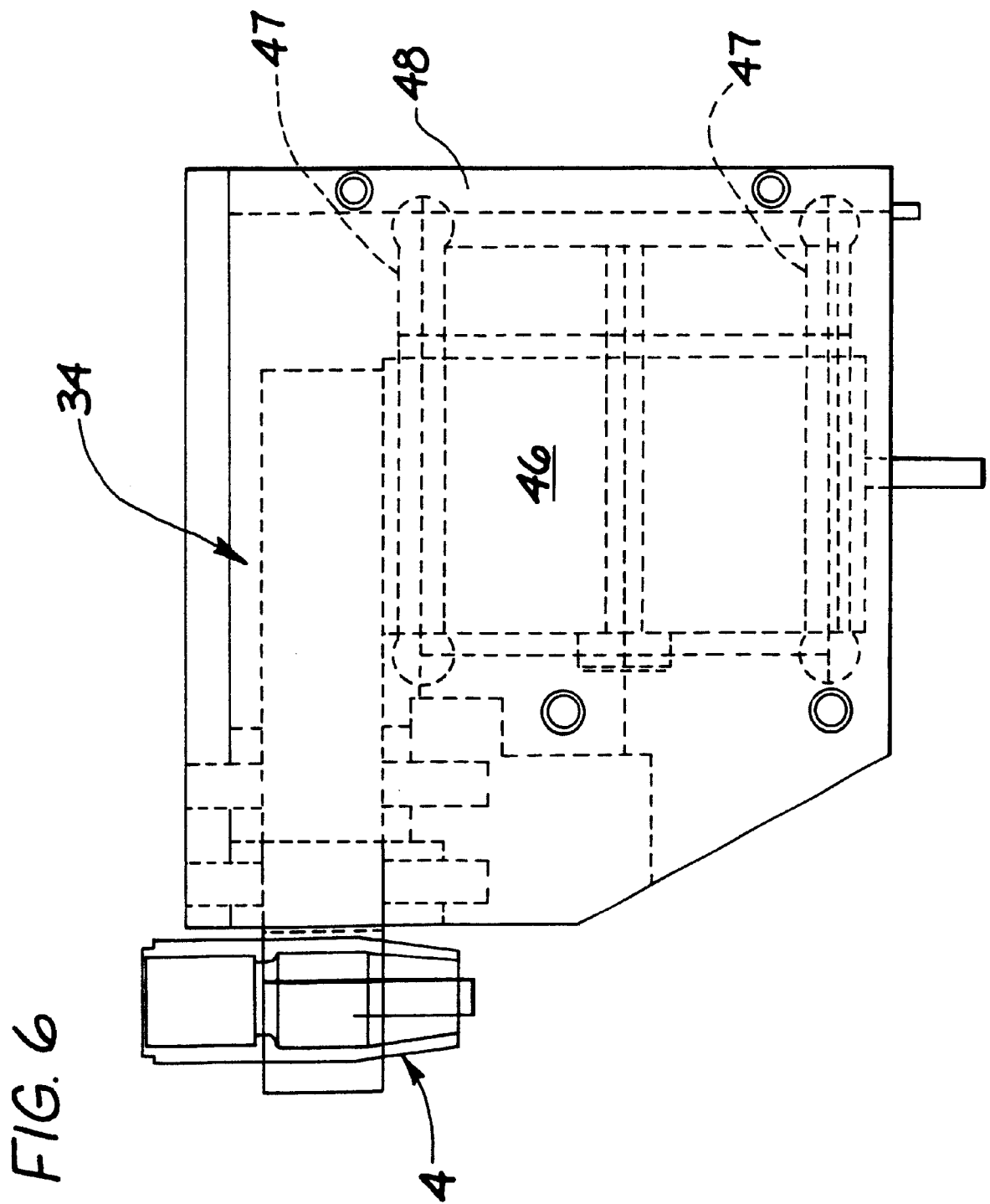
FIG. 6 depicts an elevated side view of the clamping mechanism that is adapted to engage a welding torch.
Figure 7:
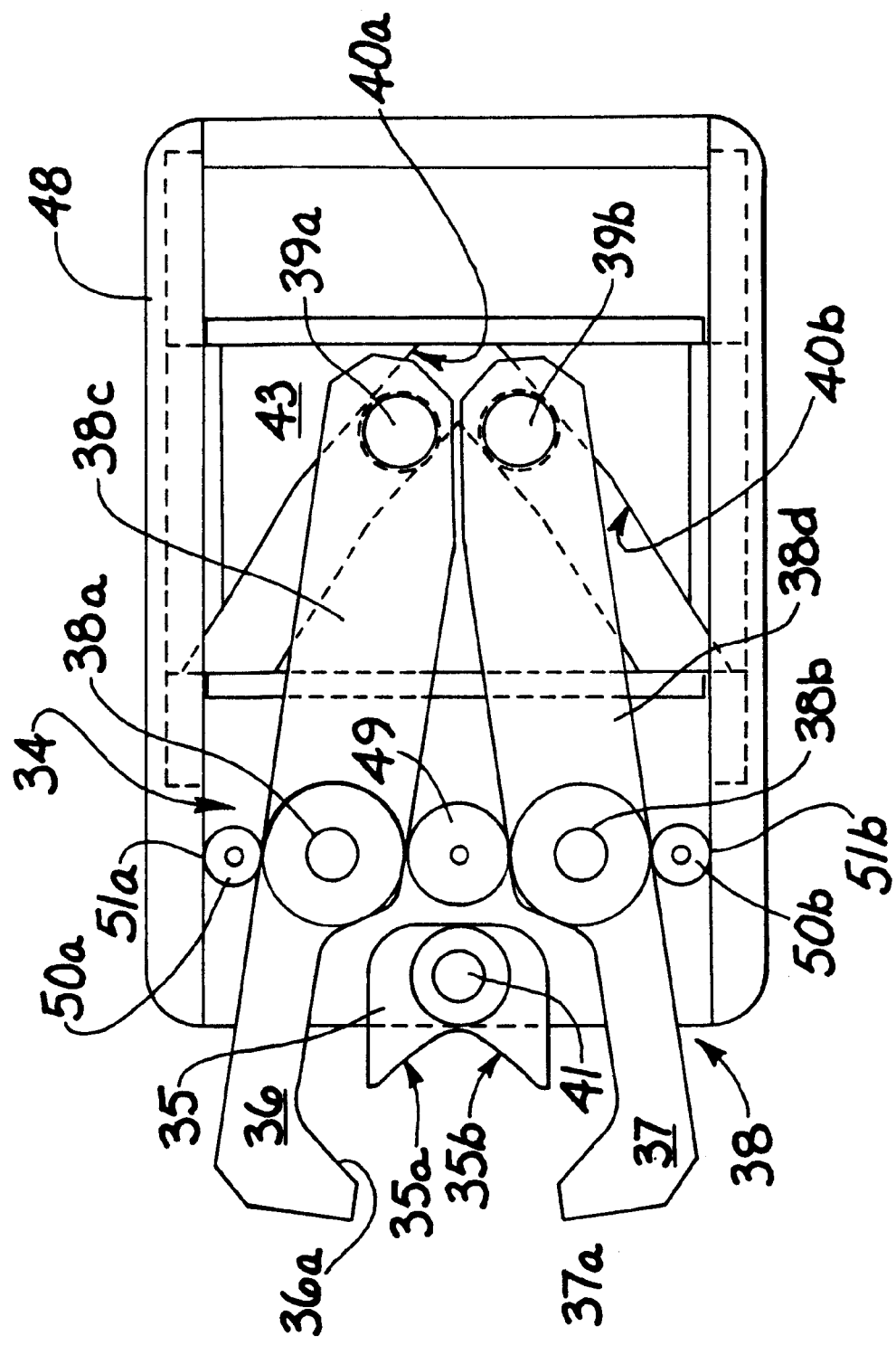
FIG. 7 depicts a top down view of the clamping mechanism shown in FIG. 6.
Figure 8B:
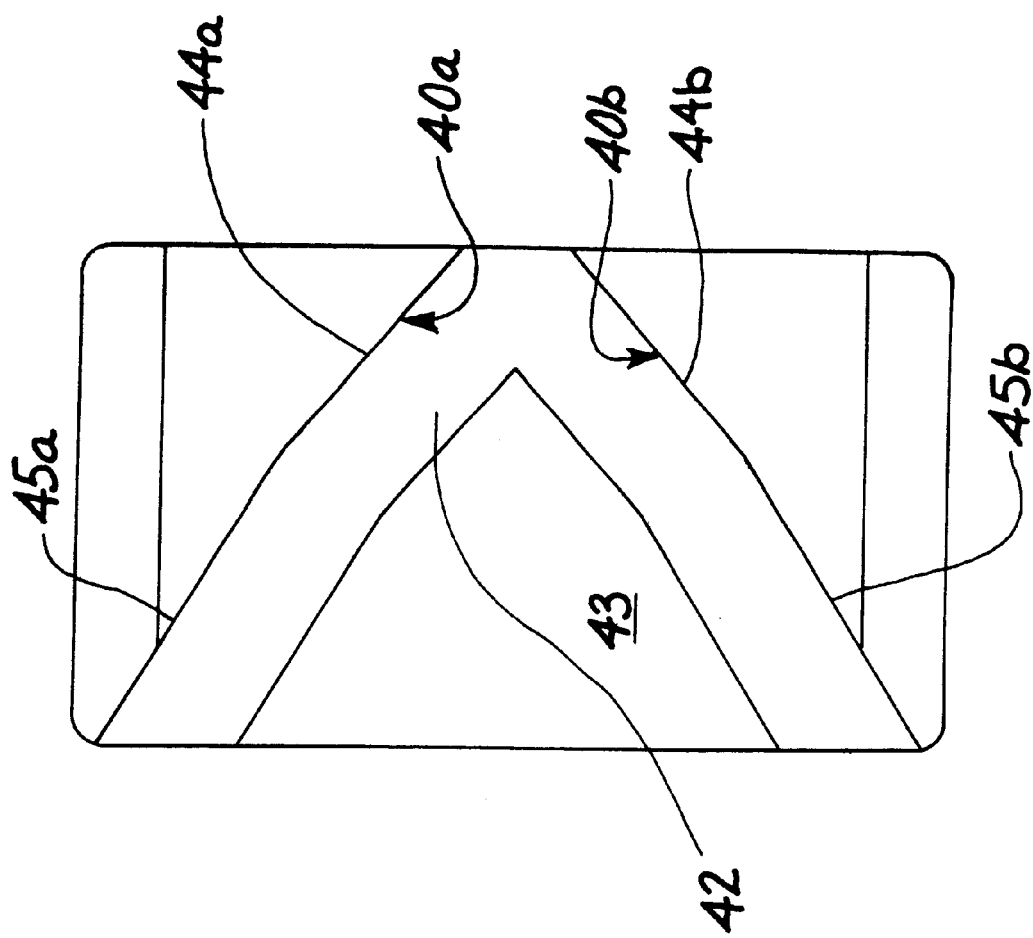
FIGS. 8a and 8b depict end and top views of portions of the clamping mechanism.
Figure 8A:
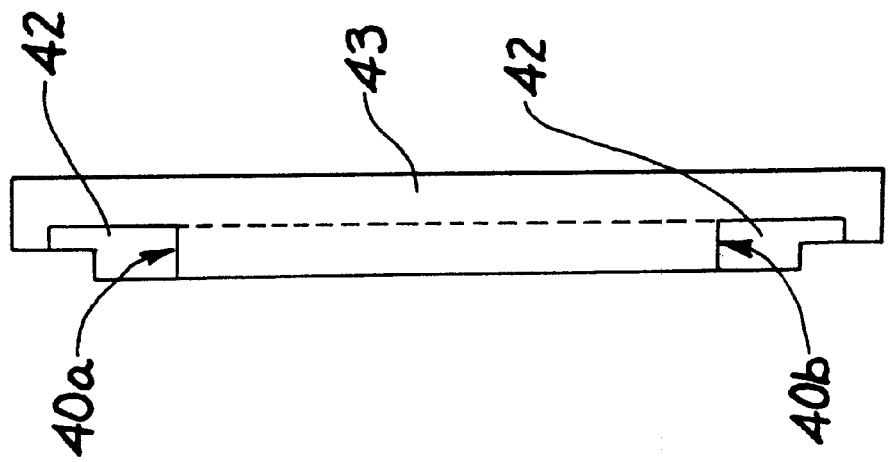

Referring now to FIGS. 6, 7 and 8 in particular, although not exclusively, there is depicted a clamp 34 for engaging a cylindrical body (e.g. the torch shield 4) between a pair of generally orthogonally-offset faces 35a and 35b of a "V"-block 35 and respective gripping surfaces 36a and 37a on gripping surface members 36 and 37 (respectively) of a pair of opposed jaws 38. Jaws 38 are arranged on respective jaw pivots 38a and 38b. Jaws 38 further include respective lever arms 38c and 38d extending beyond pivots 38a and 38b. Each lever arm (38c and 38d) support respective cam followers 39a and 39b in spaced apart relation from their respective jaw pivots 38a and 38b. Clamp 34 further includes movable cam surfaces 40a and 40b which are adapted to act on cam followers 39a and 39b to rotate lever arms 38c and 38d and associated jaws 38 about pivots 38a and 38b to move gripping surfaces 36a and 37a in and out of a three-way engagement in which the cylindrical body of torch shield 4 is engaged between surfaces 36a and 37a and orthogonal faces 35a and 35b of "V"-block 35.

Note that respective ones of the orthogonally-offset faces 35a and 35b is arranged in generally parallel, mutually-opposed relation to a corresponding gripping surface 36a and 37a, and that "V"-block 35 is mounted on a "V"-block pivot 41 around which "V"-block 35 is rotatable. This arrangement permits the cylindrical body of torch shield 4 to be engaged in self-centering relation by clamp 34.

Also note that cam surfaces 40a and 40b are side walls of a milled track 42 that is arranged in a slide plate 43. Slide plate 43 is selectively movable between positions corresponding to said gripping surfaces being, respectively, in and out of the above mentioned three-way engagement with the torch shield 4.

Track 42 is milled in such a way that the cam surfaces comprise primary portions 44a and 44b respectively, that are configured to translate (through cam followers 39a and 39b and lever arms 38c and 38d), to rapidly move jaws 38 towards engagement with a certain but relatively lower, mechanical advantage. Cam surfaces also comprise secondary portions, 45a and 45b, that are configured to translate through motion to more slowly move jaws 38 into engagement, with relatively greater mechanical advantage.

Plate 43 is selectively driven on a pneumatic piston, 46, which travels along rails 47 milled into housing 48. Plate 43, lever arms 38c and 38d, and cam followers 39a and 39b are enclosed within housing 48, while "V"-block 35 and gripping surface members 36 and 37, are all arranged externally thereof. A central resilient cylindrical seal 49 is arranged generally tangentially against jaws 38, between jaw pivots 38a and 38b, to thereby reduce ingress of debris into the interior of housing 48. In addition, respective ones of outboard cylindrical seals 50a and 50b are arranged generally tangentially between corresponding ones of jaws 38, and adjacent portions 51a and 51b of housing 48, to thereby further reduce ingress of debris into housing 48.

In general operation, (and referring to the drawings in general) torch shield 4 is approximately positioned relative to apparatus 1, (and under robotic welder control), for cleaning in accordance with some predetermined schedule or other direct or indirect criteria for maintaining welding performance. With torch shield 4 so positioned, pneumatic piston, 46 is actuated (in response to control signals not detailed herein—but for which the programming and mechanisms are generally well known in the relevant arts), and begins its transit along rails 47, carrying plate 43 along with it. As plate 43 moves, portions 44a and 44b of the cam surfaces 40a and 40b of milled track 42, act against cam followers 39a and 39b. The resulting movement of cam followers 39a and 3 9b then in turn translates into initial and relatively rapid movement of lever arms 38c and 38d about pivots 38a and 38b —and corresponding movement of the balance of jaws 38 translates into movement of members 36 and 37 such that gripping surfaces 36a and 37a advance towards respective offset faces 35a and 35b, with torch shield 4 interposed there between. This action continues until piston 46 extends to the point where cam followers 39a and 39b begin to track against respective secondary surface portions 45a and 45b. The change in the rate of displacement of the cam followers 39a and 39b as they track along these secondary surface portions 45a and 45b, reduces the rate of rotation of jaws 38 about jaw pivots 38a and 38b—slowing the progress of the gripping surfaces in the direction of shield 4, but increasing the relative mechanical advantage with which these surfaces engage shield 4. Ultimately shield 4 is brought into contact with surfaces 35a and 35b, during which time "V"-block 35 rotates passively to receive and position shield 4 into the requisite alignment above reaming tool 3. Clamp 34 completes its engagement and holds shield 4 in clamped relation between the respective faces of "V"-block 35 and surface members 36 and 37 of jaws 38, throughout the balance of the reaming operation.

With shield 4 aligned and clamped, the pneumatic supply line provides an air flow into pneumatic inlet 26 (which extends through housing 17) and from there into space 25. The air then flows from space 25 though a pneumatic passage 27 in cradle 18, and from there into air inlet 28 to drive pneumatic motor 5, which in turn spins reaming tool 3. Air is also supplied through passage 52 to drive pneumatic lift means 14, lifting piston 15 within channel 16 of housing 17, to extend reaming tool 3 into the interior of shield 4. During the reaming operation, spent air is vented from motor 5, through passage 29 and snorkel 30 and ultimately through vent means 31, to prevent accumulation of seal damaging debris on transmission shaft seals.

Figure 4A:
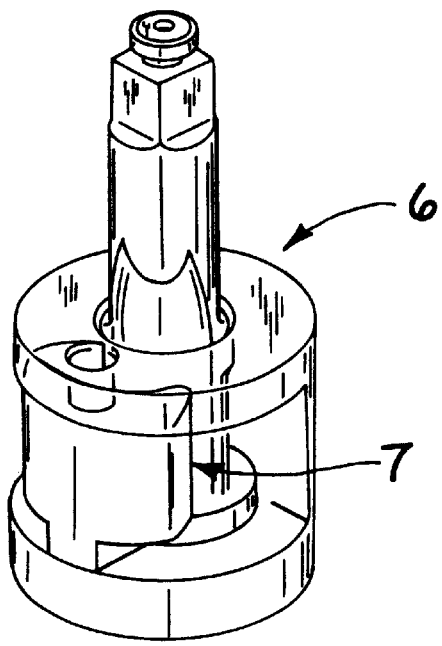
FIGS. 4a, 4b and 4c, depict an impact drive mechanism in various drive states.
Figure 4B:
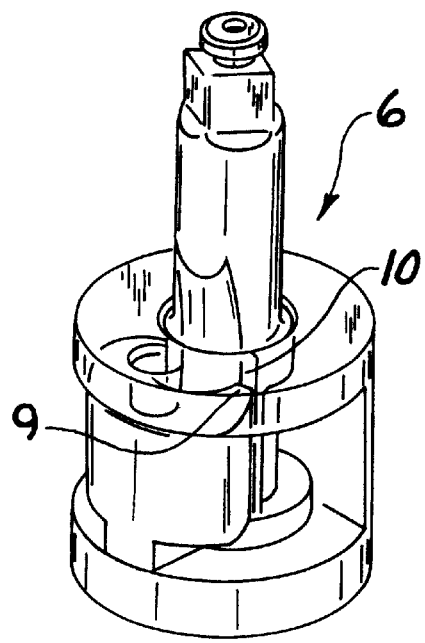
Figure 4C:
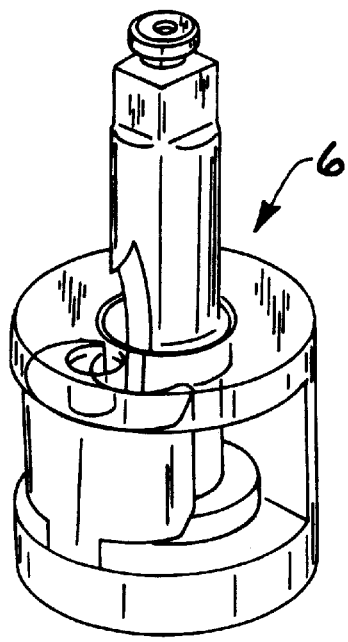

In addition, and also during the reaming operation, the impact drive cuts in under incipient stall conditions. In such circumstances, the mechanical impact-clutch intermittent drive coupling 8 operates to uncouple a reaming tool transmission side (indicated generally by 8a) of coupling 8 from a motor-powered drive side (indicated generally by 8b) thereof. Referring now in particular to FIGS. 4a, 4b and 4c, there is shown views of the coupling 8 in pre-impact, impact and post-impact positions, respectively.

Once the reaming activity is completed, clamp 34 releases shield 4, and the robotic welding control takes over in returning the torch to productive application. Other variations on the present invention will be apparent to persons skilled in the art(s) in view of the disclosure and teachings contained herein or following here-from, and the scope of the present invention is therefore constrained only by the definitions thereof as provided in the claims that ultimately issue on the basis hereof.

What is claimed is:

1. A MIG welding torch reconditioning apparatus comprising torch reconditioning means adapted to hold a reaming tool to be aligned and inserted within a gas shield of the torch and to be operable therein to remove at least some of any back-splash deposits laid down on interior surfaces of said gas shield, said torch reconditioning means comprising a mechanical, impact-clutch intermittent drive coupling arranged intermediate between a motor and said reaming tool, and operable there between to uncouple a reaming tool transmission side of said coupling from a motor-powered drive side of said coupling when, in operation, the torque available from the motor is insufficient to properly rotate the reaming tool against loads occasioned by contact of the reaming tool against welding deposits within the gas shield, whereupon the motor rotates the drive side of the coupling under unloaded-motor conditions until the drive coupling re-couples through complementary mating surfaces thereof to thereby transmit the resulting impact force through the reaming tool and against the contacted deposits.

2. The apparatus according to claim 1, wherein said motor is a pneumatically driven motor.

3. The apparatus according to claim 1, wherein said coupling is reversibly operable.

4. The apparatus according to claim 3, wherein said motor is a reversible pneumatically driven motor.

5. A MIG welding torch reconditioning apparatus comprising torch reconditioning means adapted to hold a reaming tool to be aligned and inserted within a gas shield of the torch and to be operable therein to remove at least some of any back-splash deposits laid down on interior surfaces of said gas shield;
said torch reconditioning means comprising an impact-clutch intermittent drive coupling arranged intermediate between a motor and said reaming tool, and operable there between to:
uncouple a reaming tool transmission side of said coupling from a motor-powered drive side of said coupling through disengagement of complementary hammer and reception block surfaces of said coupling, under predetermined high-load conditions; and,
re-couple said drive and transmission sides of said coupling by impacting said hammer and reception block surfaces;
whereby, in operation, if the torque available from the motor is insufficient to properly rotate the reaming tool against loads occasioned by contact of the reaming tool against deposits within the gas shield, then the drive coupling uncouples the tool from the motor, and the motor rotates the drive side of the coupling, under unloaded-motor conditions, to force said hammer and reception block surfaces to impact against one another and to thereby transmit the resulting impact force through the reaming tool and against the contacted deposits.

6. A MIG welding torch reconditioning apparatus comprising torch reconditioning means adapted to hold a reaming tool to be aligned and inserted within a gas shield of the torch and to be operable therein to remove at least some of any back-splash deposits laid down on interior surfaces of said gas shield, said torch reconditioning means comprising a motor and a reaming tool in intermittently driven relation with each other whereby when an incipient stall condition arises in which the torque available from the motor is insufficient to properly rotate the reaming tool against loads occasioned by contact of the reaming tool against back-splash deposits within the gas shield, the apparatus responds by causing the motor to discontinue driving the reaming tool until sufficient motive force can be brought to impact through the reaming tool and in turn against the contacted deposits to allow the apparatus to return to normal reaming operation, said motor being a pneumatic motor wherein its drive is suspended by a feed-back operated valve in a pneumatic supply line to said motor, said valve being operative in response to feed-back signaling an incipient stall condition to interrupt an air supply from driving said motor, and then suddenly reconnecting said supply to provide sufficient motive force to impact through the reaming tool against the contacted deposits to allow the apparatus to return to normal reaming operation.

7. The MIG welding torch reconditioning apparatus according to claim 6 wherein said clutch is mechanical, electrical, pneumatic or hydraulic.

8. A MIG welding torch reconditioning apparatus comprising torch reconditioning means adapted to hold a reaming tool to be aligned and inserted within a gas shield of the torch and to be operable therein to remove at least some of any back-splash deposits laid down on interior surfaces of said gas shield, said torch reconditioning means comprising a motor and a reaming tool in intermittent driving relation with each other whereby when an incipient stall condition arises in which the torque available from the motor is insufficient to properly rotate the reaming tool against loads occasioned by contact of the reaming tool against back-splash deposits within the gas shield, the apparatus responds by causing the motor to discontinue driving the reaming tool until sufficient motive force can be brought to impact through the reaming tool and in turn against the contacted deposits to allow the apparatus to return to normal reaming operation, the torch reconditioning means further comprising clutch means to selectively uncouple and re-couple said motor from driving relation with said reaming tool whereby when said motor encounters said incipient stall condition, said clutch responds by causing the motor to discontinue driving the reaming tool until sufficient motive force can be brought on re-engaging the clutch, to impact through the reaming tool and in turn against the contacted deposits, to allow the apparatus to return to normal reaming operation.

9. A MIG welding torch reconditioning apparatus comprising torch reconditioning means adapted to hold a reaming tool to be aligned and inserted within a gas shield of the torch and to be operable therein to remove at least some of any back-splash deposits laid down on interior surfaces of said gas shield, said torch reconditioning means comprising a motor and a reaming tool in intermittent driving relation with each other whereby when an incipient stall condition arises in which the torque available from the motor is insufficient to properly rotate the reaming tool against loads occasioned by contact of the reaming tool against back-splash deposits within the gas shield, the apparatus responds by causing the motor to discontinue driving the reaming tool until sufficient motive force can be brought to impact through the reaming tool and in turn against the contacted deposits to allow the apparatus to return to normal reaming operation, the torch reconditioning means further comprising an intermittent drive coupling arranged intermediate the motor and the reaming tool, and operable to uncouple a reaming tool transmission side of said coupling from a motor-powered drive side of said coupling when, in operation, the torque available from the motor is insufficient to properly rotate the reaming tool against loads occasioned by contact of the reaming tool against welding deposits within the gas shield, whereupon the motor rotates the drive side of the coupling under unloaded motor conditions until the drive coupling re-couples through complementary mating surfaces thereof to thereby transmit the resulting impact force through the reaming tool and against the contacted deposits.

10. Apparatus for reconditioning a MIG welding torch of the type having a gas shield, said gas shield having an opening through which gas is exhausted from the torch, said apparatus comprising:

a reaming tool insertable within the opening of the gas shield and moveable relative thereto for contacting deposits adhered to the gas shield within the opening;

a motor adapted for moving the reaming tool relative to the gas shield into contact with the deposits to apply a force against the deposits thereby facilitating the removal of said deposits from the gas shield; and a mechanism associated with the motor for applying an impact force through the reaming tool against the deposits in the event that movement of the reaming tool by the motor is substantially inhibited by any of said deposits.

11. Apparatus as set forth in claim 10 wherein the motor is operatively connected with the reaming tool for moving the reaming tool relative to the gas shield, said motor being powered by a source of power, the apparatus being adapted for temporarily disrupting the supply of power to the motor in the event that movement of the reaming tool relative to the gas shield is substantially inhibited by any of the deposits and for subsequently re-powering the motor to apply an impact force through the reaming tool against said deposits.

12. Apparatus as set forth in claim 10 wherein the motor is adapted for operative connection with the reaming tool for moving the reaming tool relative to the gas shield, said motor being temporarily out of operative connection with the reaming tool in response to movement of the reaming tool relative to the gas shield being substantially inhibited by any of the deposits and being subsequently reconnected with the reaming tool to apply an impact force through the reaming tool against said deposits.

13. Apparatus as set forth in claim 12 wherein said mechanism comprises a clutch adapted for operatively connecting the motor with the reaming tool, the clutch having a drive side operatively connected with the motor and a transmission side operatively connected with the reaming tool for conjoint movement therewith, the drive side of the clutch being adapted for coupling with the transmission side of the clutch to operatively connect the drive motor with the reaming tool, said drive side and said transmission side of the clutch being temporarily uncoupled in response to movement of the reaming tool relative to the gas shield being substantially inhibited by any of the deposits and being subsequently re-coupled, said re-coupling of the drive side and transmission side of the clutch generating an impact force whereby said impact force is applied through the reaming tool against said deposits.

14. A method of reconditioning a MIG welding torch of the type having a gas shield, said gas shield having an opening through which gas is exhausted from the torch, said apparatus comprising:

inserting a reaming tool within the opening of the gas shield;

moving the reaming tool relative to the gas shield within said opening into contact with deposits adhered to the gas shield within the opening; and applying an impact force through the reaming tool against the deposits in the event that movement of the reaming tool relative to the gas shield is substantially inhibited by any of said deposits.

15. A method as set forth in claim 14 wherein the apparatus further comprises a motor operatively connected with the reaming tool for moving the reaming tool relative to the gas shield, said step of applying an impact force comprising temporarily disrupting operation of the motor in the event that movement of the reaming tool relative to the gas shield is substantially inhibited by any of the deposits, and subsequently reestablishing operation of the motor to apply an impact force through the reaming tool against the deposits.

16. A method as set forth in claim 15 wherein the apparatus further comprises a motor adapted for operative connection with the reaming tool for moving the reaming tool relative to the gas shield, the step of applying an impact force comprising temporarily disconnecting the motor from the reaming tool in response to movement of the reaming tool relative to the gas shield being substantially inhibited by any of the deposits, and subsequently reconnecting the motor with the reaming tool to apply an impact force through the reaming tool against said at least one of the deposits.

17. A method as set forth in claim 16 wherein the apparatus further comprises a clutch adapted for operatively connecting the motor with the reaming tool, the clutch having a drive side operatively connected with the motor and a transmission side operatively connected with the reaming tool for conjoint movement therewith, the drive side of the clutch being adapted for coupling with the transmission side of the clutch to operatively connect the drive motor with the reaming tool, said step of applying an impact force comprising temporarily uncoupling the drive side of the clutch from the transmission side to disconnect the motor from the reaming tool, and subsequently re-coupling the drive side of the clutch with the transmission side, said re-coupling step comprising impacting the drive side of the clutch against the transmission side to generate an impact force whereby said impact force is applied through the reaming tool against said deposits.

* * * * *